United States Patent
McKinstrie et al.

(10) Patent No.: US 10,547,462 B2
(45) Date of Patent: Jan. 28, 2020

(54) GENERATION OF MULTIPLE LOW-NOISE COPIES OF OPTICAL SIGNALS

(71) Applicant: VENCORE LABS, INC., Basking Ridge, NJ (US)

(72) Inventors: Colin McKinstrie, Basking Ridge, NY (US); Anjali Agarwal, Basking Ridge, NJ (US)

(73) Assignee: Perspecta Labs Inc., Basking Ridge, NJ (US)

( * ) Notice: Subject to any disclaimer, the term of this patent is extended or adjusted under 35 U.S.C. 154(b) by 0 days.

(21) Appl. No.: 15/343,514

(22) Filed: Nov. 4, 2016

(65) Prior Publication Data

US 2017/0149577 A1 May 25, 2017

Related U.S. Application Data

(60) Provisional application No. 62/251,450, filed on Nov. 5, 2015.

(51) Int. Cl.
*H04L 12/18* (2006.01)
(52) U.S. Cl.
CPC .................................. *H04L 12/18* (2013.01)
(58) Field of Classification Search
None
See application file for complete search history.

(56) References Cited

U.S. PATENT DOCUMENTS

| | | | | |
|---|---|---|---|---|
| 2005/0094928 | A1* | 5/2005 | Ng | G02B 6/12019 385/15 |
| 2007/0110442 | A1* | 5/2007 | Peer | H04J 14/005 398/78 |
| 2013/0155491 | A1* | 6/2013 | McKinstrie | H04B 10/299 359/326 |
| 2016/0079735 | A1* | 3/2016 | Shahine | H01S 5/1092 359/345 |

OTHER PUBLICATIONS

McKinstrie et al, "Quantum noise properties of parametric amplifiers driven by two pump waves", Oct. 18, 2004, Optics Express, vol. 12, No. 21, pp. 5037-5066.*

* cited by examiner

*Primary Examiner* — David W Lambert
(74) *Attorney, Agent, or Firm* — Heslin Rothenberg Farley & Mesiti P.C.

(57) ABSTRACT

A system and method for generating copies of a signal includes a first radiation source configured for providing a plurality of pump radiation beams, a second radiation source configured for providing a signal radiation beam, and a second-order nonlinear optical medium to receive the plurality of pump radiation beams from the first radiation source and the signal radiation beam from the second radiation source and to emit a plurality of idlers, where the plurality of idlers are low-noise copies of the signal.

17 Claims, 1 Drawing Sheet

GENERATION OF MULTIPLE LOW-NOISE COPIES OF OPTICAL SIGNALS

CROSS-REFERENCE TO RELATED APPLICATIONS

This application claims priority to U.S. Provisional Application No. 62/251,450 filed Nov. 5, 2015, entitled, "GENERATION OF MULTIPLE LOW-NOISE COPIES OF OPTICAL SIGNALS" which is incorporated herein by reference in its entirety.

FIELD OF INVENTION

The present invention relates to signal processing and specifically, generating multiple faithful copies of a signal for multicasting.

BACKGROUND OF INVENTION

Multicasting is a useful signal-processing function in which copies of a signal, i.e., idlers, can be broadcast to multiple users. Multiple copies of a given signal may also be used to sample short/broad-bandwidth signals in both the time and frequency domains, the former is called waveform sampling and the latter is called channelization, respectively. The efficacy of these techniques is dependent the quality of the copies of the signal. Ideally, idlers should have the same shapes/spectra as the signal, and should not be polluted with excess noise, which makes them harder to read (i.e., measure).

SUMMARY OF INVENTION

Shortcomings of the prior art are overcome and additional advantages are provided through a system for generating copies of a signal. In one embodiment, the system includes a first radiation source configured for providing a plurality of pump radiation beams; a second radiation source configured for providing a signal radiation beam, and a second-order nonlinear optical medium to receive the plurality of pump radiation beams from the first radiation source and the signal radiation beam from the second radiation source and to emit a plurality of idlers, wherein the plurality of idlers comprise low-noise copies of the signal.

Shortcomings of the prior art are overcome and additional advantages are provided through method of generating copies of a signal. In one embodiment, the method includes obtaining, by a second-order nonlinear optical medium, a plurality of pump radiation beams from a first radiation source; obtaining, by the second-order nonlinear optical medium, a signal radiation beam from a second radiation source; and emitting, from the second-order nonlinear optical medium, a plurality of idlers, wherein the plurality of idlers comprise low-noise copies of the signal.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings.

DETAILED DESCRIPTION OF THE INVENTION

Figure 1:
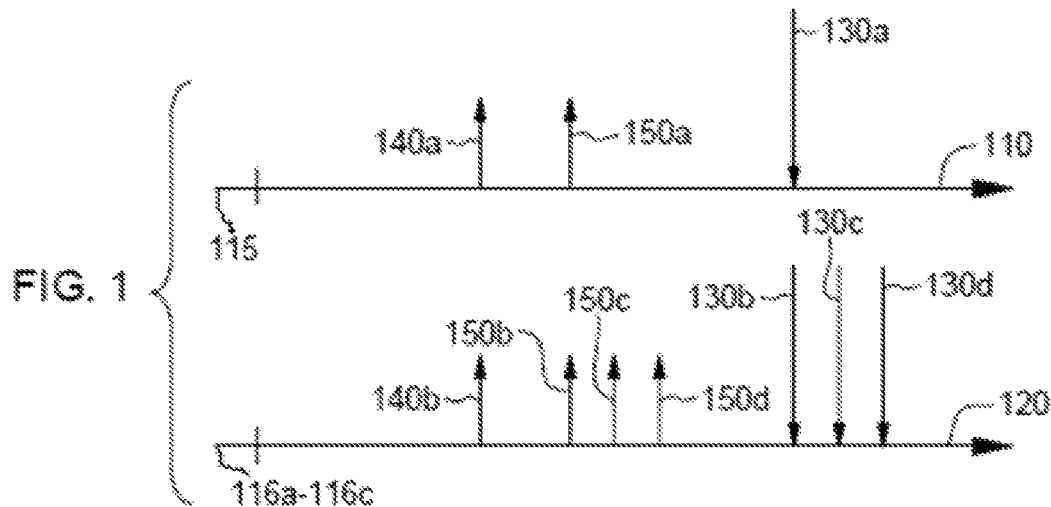
FIG. 1 depicts certain aspects of an embodiment of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

Aspects of the present invention provide systems and methods for generating multiple low-noise, yet high quality, copies of an optical signal utilizing three-wave mixing (TWM), and in particular, difference-frequency generation (DFG) processes. In an embodiment of the present invention, three-wave mixing processes occur in second-order (chi2) nonlinear optical media. An embodiment of the present invention includes DFG driven by multiple pumps, which amplifies a signal and generates multiple idlers (copies of the signal); one idler is generated per each pump. In various embodiments of the present invention, these pumps can be produced by individual lasers (FIG.1, 115; FIG. 1, 116a-116c), and/or an optical frequency comb (FIG.1, 116a-116c).The quality of an optical signal (or idler) is quantified by its signal-to-noise ratio (SNR), which is the coherent signal power divided by the noise power. The noise figure of idler generation (copying) is the SNR of the input signal divided by the SNR of the output idler SNR. It is a figure of demerit. Noise figures cannot be less than 1 (0 dB) and noise figures of order 1 are considered good. In an embodiment of the present invention, in the high-gain regime, each idler noise figure is 2 (3 dB), independent of the number of idlers. Thus, by utilizing DFG, an embodiment of the present invention can generate a large number of idlers and regardless of this number, experience the same noise, as noise is independent of the number of idlers. In this manner, embodiments of the present invention can be utilized to generate multiple copies of an optical signal without each subsequent copy further degenerating the quality of the copies overall.

Multiple-pump DFG is mathematically equivalent to single-pump DFG followed by multiple-mode idler beam-splitting. When utilizing DFG in an embodiment of the present invention, in single-pump DFG (which has a noise figure of 3 dB) the idler-sum mode has a strong coherent component and strong fluctuations. Such a mode is insensitive to the vacuum fluctuations associated with the virtual beam splitter. The physical idler modes produced by the virtual bean splitter also have strong coherent fields and strong fluctuations, which are correlated. Beam splitting reduces the coherent and incoherent powers by the same amount, so each physical idler mode has the same SNR as the idler sum-mode. In an embodiment of the present invention, parametric amplification by DFG adds excess noise to an output signal and idlers, so no output is a perfect copy of the signal. However, as understood by one of skill in the art, DFG produces outputs that are amplified copies of the signal whose fluctuations are correlated and phase-dependent.

Aspects of the present invention provide certain advantages over method presently utilized to create multiple copies of optical signals. Some multicasters presently utilize four-wave mixing (FWM) processes, which unlike the processes of embodiments of the present invention, are hard to model. One advantage of utilizing three-wave mixing (TWM), in accordance with certain embodiments of the present invention, is that TWM processes (which occur in different media), when utilized in these embodiments, can provide the same functionality as FWM multicasters, but there are fewer sideband interactions in a TWM-based multicaster, making for more faithful copies of the signal. Another advantage of embodiments of the present invention is that the present method enables the creation of an unlimited number of copies of a signal, without significant deterioration of the signal, regardless of the number of copies. In contrast, in FWM methods, in most cases, the noise figure of each idler-generation processes scales linearly with the number of idlers, so making more copies usually results in lower-quality idlers. Another advantage of certain embodiments of the present invention that they enable optical preprocessing to replace high-speed electrical sampling by multiple instances of moderate-speed sampling and broad-bandwidth electrical sampling by multiple instances of moderate-bandwidth sampling. Applications of these sampling schemes include the analog-to-digital conversion and channelization of radio-frequency signals.

Historically, DFG (and sum-frequency generation, SFG) were implemented with one pump, and one idler (copy) was produced. Embodiments of the present invention utilize multiple pumps to generate multiple idlers. Certain embodiments of the present invention involve a moderately-noisy DFG process that produces more useable multiple idlers than a noiseless SFG process.

The utilization of DFG in an embodiment of the present invention is explained in detailed in the paper Signal replication by multiple sum- or difference frequency generation, which is provided as Appendix A and incorporated herein in its entirety.

FIG. 1 is a frequency diagram depicting DFG driven by one pump 110 and three pumps 120, in accordance with an embodiment of the present invention. In TWM, which occurs in a second-order nonlinear medium, a strong pump wave drives weak signal and idler waves. The longer arrows denote the pumps 130a-130d, the arrows to the left denote the signal 140a-140b, and the most central arrows denote the idlers 150a-150d. As noted above, aspects of the present invention produce one idler for each pump. In DFG, the signal is amplified and an idler is generated, whereas in sum-frequency generation (SFG), another type of TWM described in the Appendix, the signal power is transferred to the idler. If the single pump is replaced by multiple pumps (e.g., a frequency comb), multiple TWM processes occur. Embodiments of the present invention utilize DFG instead of SFG because while the common noise figure in SFG is tied to the number of pumps, in DFG, the common noise figure is independent of the number of pumps, enabling the generation of many low-noise idlers. Each DFG idler is a conjugated copy of the signal.

Figure 2:
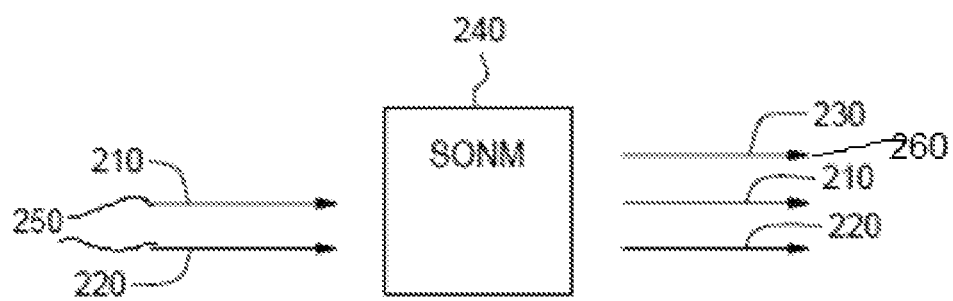
FIG. 2 depicts certain aspects of an embodiment of the present invention.

FIG. 2 also depicts aspects of an embodiment of the present invention. In FIG. 2, pump 210 (p), signal 220 (s), and idler 230 (i) comprise, respectively, pump, signal and idler laser beams. SONM 240 is a second-order nonlinear optical medium (material). Beams enter on the left and exit on the right. Extrapolating FIG. 1 to FIG. 2, by increasing the number of pumps, the number of idlers will also increase. As seen in FIG. 2, beams enter the SONM 240 (e.g., a medium) on the left and exit on the right. As can be seen in FIG. 2, the SONM 240 is not needed to produce the pump(s) and signal. In an embodiment of the present invention, the pump(s) and the signal originate from lasers 250, but the idlers are generated by the SONM 240.

In an embodiment of the present invention, DFG produces outputs that are amplified copies of the signal and whose fluctuations are correlated and phase-dependent. The correlations are maximal when $\phi_i = -\phi_s$ which case each local-oscillator (LO) phase is aligned with the appropriate output phase. (The real fluctuations are correlated, whereas the imaginary ones are anti-correlated.) In the high-gain regime ($\mu \approx \nu \gg 1$), the output fluctuations are correlated completely. The output idler is a perfect (conjugated) copy of the output signal. By combining the preceding results, one obtains the noise figures in Equation 1 below. In the high-gain regime, the signal and idler noise figures are approximately 2 (3 dB), in this non-limiting example. Parametric amplification by DFG adds excess noise to the output signal and idler (so neither output is a perfect copy of the input signal).

$$F_s = 1 + \nu^2/\mu^2, F_s = 1 + \mu^2/\nu^2. \qquad \text{(Equation 1)}$$

In an embodiment of the present invention, the (common) idler-generation noise figure is 2 (3 dB), independent of the number of pumps. This quality of embodiments of the present invention can be demonstrated utilizing the coupled-mode equations (CMEs) for DFG driven by multiple pumps. The solutions (transfer functions) can be used to determine a covariance matrix (quadrature variances and correlations) of the output signal and idlers, and the noise figures of the idler-generation processes. This mathematical demonstrations of the results can be understood in terms of physical embodiments of the present invention in terms of superposition modes and simpler processes. In an embodiment of the present invention, beam splitting does not reduce the SNRs of the output modes relative to that of the input sum mode, because the amplified fluctuations associated with the sum mode swamp the vacuum fluctuations associated with the others modes.

In an embodiment of the present invention, in DFG (which has a noise figure of 3 dB) the idler-sum mode has a strong coherent field and strong fluctuations. Such a mode is insensitive to the vacuum fluctuations associated with the virtual beam splitter. The physical modes also have strong coherent fields and strong fluctuations, which are correlated. Beam splitting reduces the coherent and incoherent powers by the same factor of n, so each physical mode has the same SNR as the sum mode.

An embodiment of the present invention includes a system and a method for generating copies of a signal. In one aspect, the system may include a first radiation source configured for providing a plurality of pump radiation beams and a second radiation source configured for providing a signal radiation beam. The system may also include a second-order nonlinear optical medium to receive the plurality of pump radiation beams from the first radiation source and the signal radiation beam from the second radiation source and to emit a plurality of idlers, which as aforementioned, are low-noise copies of the signal.

In another aspect of an embodiment of the present invention, in the system and/or method, an idler-generation noise figure is independent of the number of pumps.

In an embodiment of the first invention, the first radiation source may include an optical frequency comb.

In an embodiment of the present invention, the number of pumps may equal the number of idlers wherein the plurality of pump radiation beams is equal to the plurality of idlers.

In an embodiment of the present invention, the first radiation source may include at least two individual lasers.

In an embodiment of the present invention, the idlers may include amplified copies of the signal radiation beam and the idlers may be correlated and phase-dependent.

An embodiment of the present invention may include an optical preprocessing device (FIG.2, 260) to receive the idlers emitted from the medium (FIG. 2, 240). This preprocessing device may utilize a portion of the idlers in one of: analog-to-digital conversion, or channelization of radio-frequency signals.

An example and further explanation of certain aspects of an embodiment of the present invention is discussed below.

As aformentioned, in FWM, which occurs in a third-order nonlinear medium (such as a fiber), one or two strong pump waves drive weak signal and idler waves (sidebands). Thus, parametric devices based on FWM can amplify, frequency-convert and phase-conjugate optical signals in communication systems. They also enable high performance sampling, in both the time and frequency domains. When a train of similar signal pulses is illuminated by a train of short pump pulses, each pump pulse generates a short idler pulse (by degenerate FWM), whose peak power is proportional to the signal power at the instant it was sampled (and whose energy can be measured by a moderate-speed detector). If the separation of the pump pulses differs slightly from that of the signals, each pump samples a different time-slice of its signal, so the average shape (waveform) of the signal pulses can be inferred. However, id multiple copies of the signal are made, each with a different carrier frequency, then, by passing the copies (idlers) through a dispersive medium, one can delay them relative to one another, so that a short pump pulse illuminates different time-slices of the idlers. In this way, one can measure the shape of an individual signal pulse. Alternatively, one can send the idlers through a periodic frequency filter. If the spacing between the passband frequencies differs slightly from that of the idler frequencies, each passband transmits (samples) a different part of its idler spectrum. In this way, one can measure the complete spectrum of a broad-bandwidth signal or separate the spectra of synchronous narrow-bandwidth signals. Thus, one can use optical preprocessing to replace high-speed electrical sampling by multiple instances of moderate-speed sampling and broad-bandwidth electrical sampling by multiple instances of moderate-bandwidth sampling. As discussed above, applications of these sampling schemes include the analog-to-digital conversion and channelization of radio-frequency signals.

The schemes discussed above are enabled by the generation of faithful copies of the signal: The idlers should have the same shapes (spectra) as the signal, and should not be polluted with excess noise, which makes them harder to read (measure) than the signal. In the standard copying (replication) scheme, two strong pumps and a weak signal are launched into a fiber. Multiple FWM processes produce new pumps and idlers (which are copies of the signal). Although this scheme works well (and produces outputs that are amplified versions of the input signal), it also has drawbacks. First, the number of FWM processes increases faster than the square of the number of pumps or sidebands, so it is difficult to model replication analytically. Strategies for optimizing the operation of a FWM-based copier (for example, equalizing the output idler powers) must be determined by doing numerical simulations based on the nonlinear Schrodinger equation and using numerical search algorithms. Second, in multiple-sideband mixing the noise figure of each idler-generation process usually scales linearly with the number of sidebands, so making more copies usually results in lower-quality idlers. Fortunately, numerical simulations revealed specific dispersion conditions under which the idler noise figures can be limited to about 6 dB. This limit is 3-dB higher than the noise figure of two-sideband amplification and 6-dB higher than the noise figure of two-sideband frequency conversion. Because of the aforementioned issues, it is useful to consider other replication schemes.

In three-wave mixing (TWM), which occurs in a second-order nonlinear medium, a strong pump wave drives weak signal and idler waves. In DFG, the signal is amplified and an idler is generated ($\pi_p \rightarrow \pi_s + \pi_i$ where $\pi_j$ represents a photon with frequency $\omega_j$). The letter "p" represents pump, "s" represents signal, and "i" represents idler. As seen in FIG. 1, each DFG idler is a conjugated copy of the signal.

DFG can be utilized to process a strong pump wave, which does not evolve and drive weak signal and idler waves (modes), which do evolve. In one example, $\alpha$ and $\alpha_i$ are the signal and idler mode amplitude operators, respectively. These operators satisfy the boson commutation relation $[\alpha_j, \alpha_k] = 0$ and $[\alpha_j, \alpha_k^\dagger] = \delta_{jk}$, where $[x, y] = xy - yx$ is a commutator, $\dagger$ is a Hermitian conjugate and $\delta_{jk}$ is the Kronecker delta. The real and imaginary parts of the mode amplitudes (quadratures) can be measured by homodyne detection, which involves a local oscillator (LO). Each quadrature operator can be represented Equation 2, where $\phi_j$ is an LO phase.

$$p_j(\phi_j) = (a_j^\dagger e^{i\phi_j} + a_j e^{-i\phi_j})/2^{1/2} \quad \text{(Equation 2)}$$

By combining this definition with the amplitude commutation relations, one obtains the quadrature commutation relations, noted in Equation 3.

$$[p_j(\phi_j), p_k(\phi_k + \pi/2)] = i\delta_{jk}, \quad \text{(Equation 3)}$$

The input signal and idler are characterized by their quadrature means, $\langle p_j(\phi_j) \rangle$, where $\langle \rangle$ is an expectation value, and the quadrature covariance matrix is noted below as Equation 4.

$$C_p(\phi_j, \phi_k) = \langle \delta p_j(\phi_j) \delta p_k(\phi_k) \rangle, \text{ where } \delta p_j(\phi_j) = p_j(\phi_j) - \langle p_j(\phi_j) \rangle \quad \text{(Equation 4)}$$

For a coherent-state (CS) signal and a vacuum-state (VS) idler, the quadrature means is represented by Equation 5 below.

$$\langle p_s(\phi_s) \rangle = 2^{1/2} |\alpha| \cos(\phi_s - \phi_\alpha), \langle p_i(\phi_i) \rangle = 0, \quad \text{(Equation 5)}$$

In Equation 5, $\alpha = |\alpha| e^{i\phi_\alpha}$ the CS amplitude. The measured signal quadrature is maximal when the LO phase equals the signal phase, ($\phi_s = \phi_\alpha$).

A covariance matrix is Equation 6 below, where $\sigma = \frac{1}{2}$. Equation 6 shows that the input signal and idler have uncorrelated vacuum-level fluctuations, which do not depend on the LO phases. For reference, the signal-to-noise ratio (SNR) of the signal is defined to be the square of the quadrature mean divided by the quadrature variance. The SNR attains its maximal value $4|\alpha|^2$ when the LO phase equals the signal phase.

$$C_p(\phi_s, \phi_i) = \sigma \begin{bmatrix} 1 & 0 \\ 0 & 1 \end{bmatrix} \quad \text{(Equation 6)}$$

In the high-conversion regime (p≈1), the idler noise figure is approximately 1 (0 dB), which means that the output idler is a perfect copy of the input signal. DFG is governed by the IO equations, reproduced below, which involve the signal and idler operators, and their conjugates. The transfer coefficients $\mu$ and $\nu$ satisfy the auxiliary equation $|\mu|^2-|\nu|^2=1$, which ensures that signal and idler photons are produced in pairs. By choosing the phase references of the input and output modes judiciously, one can replace Equation 7 by similar equations, in which $\mu$ and $\nu$ are real. By combining Equation 7 with their conjugates, one obtains the quadrature IO equations, Equation 8 and Equation 9, reproduced with Equation 7 below, and with Equation 10, which is the output means of the IUO quadrature equations, Equation 8 and Equation 9.

$$b_s = \mu a_s + \nu a_i^+, b_i = \nu a_s^+ + \mu a_i, \quad \text{(Equation 7)}$$

$$q_s(\phi_s) = \mu p_s(\phi_s) + \nu p_i(-\phi_s) \quad \text{(Equation 8)}$$

$$q_i(\phi_i) = \nu p_s(-\phi_i) + \mu p_i(\phi_i) \quad \text{(Equation 9)}$$

$$\langle q_s(\phi_s) \rangle = \mu \langle p_s(\phi_s) \rangle, \langle q_i(\phi_i) \rangle = \nu \langle p_s(-\phi_i) \rangle \quad \text{(Equation 10)}$$

The output signal quadrature is proportional to the input signal quadrature, measured with the same LO phase, whereas the output idler quadrature is proportional to the input signal quadrature, measured with the opposite LO phase. This opposite-phase relation is a consequence of the conjugates in Equation 7, and signifies that the output idler is a conjugated copy of the input signal. As understood by one of skill in the art, if one were to derive IO equations for the real and imaginary quadratures separately, one would find that the real equations are identical to the preceding ones, whereas the imaginary equations differ only in the sign of $\nu$. The output covariance matrix is included below as Equation 11.

$$C_q(\phi_s, \phi_i) = \sigma \begin{bmatrix} (\mu^2 + \nu^2) & 2\mu\nu\cos(\phi_s + \phi_i) \\ 2\mu\nu\cos(\phi_i + \phi_s) & (\mu^2 + \nu^2) \end{bmatrix} \quad \text{(Equation 11)}$$

Thus, DFG produces outputs that are amplified copies of the signal, and whose fluctuations are correlated and phase-dependent. The correlations are maximimal when $\phi_i = -\phi_s$, in which case each LO phase is aligned with the appropriate output phase. Hence, the real fluctuations are correlated, whereas the imaginary ones are anti-correlated. In the high-gain regime ($\mu \approx \nu \geq 1$), the output fluctuations are correlated completely such that the output idler is a perfect (conjugated) copy of the output signal. By combining the preceding results, one obtains the noise figures, as noted below in Equation 12.

$$F_s = 2 - 1/\mu^2, F_i = 2 + 1/\nu^2 \quad \text{(Equation 12)}$$

In the high-gain regime, the signal and idler noise figures are approximately 2 (3 dB); parametric amplification by DFG adds excess noise to the output signal and idler (so neither output is a perfect copy of the input signal).

DFG driven by a comb of pumps (multiple DFG) is governed by the CMEs, as demonstrated below in Equation 13.

$$d_z\alpha_s = i\Sigma_j \gamma_j \alpha_j^t, d_z\alpha_i = i\gamma_i\alpha_s^t \quad \text{(Equations 13-14)}$$

The effects of secondary TWM on DFG were discussed earlier and by proceeding as described above, the transformed CMEs are obtained. In Equations 15-16 below, $\gamma$ is real, $\alpha_s$ is coupled to $\alpha_i^t$ and vice versa and there is no "−" sign in the first equation. By combining Equation 15-16 with their conjugates and using the commutation relations, one finds Equations 17-18. By further combining Equations 17-18, with each other, one obtains the Manley-Rowe-Weiss (MRW) equation, Equation 19, which is mathematical expressions utilized to predict the amount of energy in a wave that has multiple frequencies. The MRW equation, Equation 19, reflects that signal and idler photons are produced in pairs (e.g., $\pi_s$ and $\pi_j$, or $\pi_s$ and $\pi_2$, etc.). By defining a pseudo-amplitude vector, $X = [\alpha_s^\dagger, \alpha_1, \ldots \alpha_n]^t$, the general solution of Equations 13-14 can be written in matrix IO form, as Equation 20 below, with the transfer matrix of Equation 21.

$$d_z a_s = \gamma \sum_i a_i^\dagger,$$
$$d_z a_i = \gamma a_s^\dagger$$

$$d_z a_s^\dagger a_s = \gamma \sum_i (a_s^\dagger a_i^\dagger + a_s a_i), \quad \text{(Equation 17-18)}$$
$$d_z a_i^\dagger a_i = \gamma(a_s^\dagger a_i^\dagger + a_s a_i)$$

$$d_z\left(a_s^\dagger a_s - \sum_i a_i^\dagger a_i\right) = 0 \quad \text{(Equation 19)}$$

$$X(z) = T(z)X(0) \quad \text{(Equation 20)}$$

$$T(z) = \begin{bmatrix} c & s' & \ldots & s' \\ s' & 1+c' & \ldots & c' \\ \vdots & \vdots & \ddots & \vdots \\ s' & c' & \ldots & 1+c' \end{bmatrix} \quad \text{(Equation 21)}$$

Equations 22-25 are true in the above expressions.

$$c = \cos h(\gamma n^{1/2} z), c' = (c-1)/n \quad \text{(Equation 22)}$$

$$s' = \sin h(\gamma n^{1/2} z)/n^{1/2}, \quad \text{(Equation 23)}$$

In the lower-right block of this matrix, only the diagonal elements include 1s. For the symmetrical case in which $\alpha_s(0) \neq 0$ and $\alpha_i(0) = 0$, the output signal power us larger than the input signal power by the (common) factor $(s')^2 = s^2/n$, where $s = \sin h(\gamma n^{1/2} z)$. For the asymmetric case in which $\alpha_s(0) = 0$ and $\alpha_i(0) = 0$ and $\alpha_j(0) = 0$ for $j \neq I$, the output signal power is larger than the input idler power by the factor $s^2/n$. In the high-gain regime, each output idler power is larger than the input idler power by a factor of $c^2/n^2$.

By combining the amplitude IO equations, e.g., Equation 20, with their conjugates, the IO equations, Equations 24-25 can be obtained. Equations 24-25 involve the same transfer coefficients as the amplitude equations. The imaginary quadratures satisfy similar equations, with which $\tau_{sj} \to -\tau_{sj}$ and $\tau i_s \to -\tau i_s$. Thus, one can derive results for the real quadratures, then deduce the imaginary results from the real ones by changing the sign of s' (Equation 21). As understood by one of skill in the art, it remains true that $C_q = TC_p T^t$, but it is not true that $TT^t = 1$. Through matrix multiplication, the output converse matrix below, Equation 26, is obtained.

$$q_s(\phi_s) = \tau_{ss} p_s(\phi_s) + \sum_j \tau_{sj} p_j(-\phi_s), \quad \text{(Equation 24)}$$

-continued $$q_i(\phi_i) = \tau_{is} p_s(-\phi_i) + \sum_j \tau_{ij} p_j(\phi_i) \quad \text{(Equation 25)}$$

$$c_q = \sigma \begin{bmatrix} 1+2s^2 & 2cs' & \ldots & 2cs' \\ 2cs' & 1+2(s')^2 & \ldots & 2(s')^2 \\ \vdots & \vdots & \ddots & \vdots \\ 2cs' & 2(s')^2 & \ldots & 1+(2s')^2 \end{bmatrix} \quad \text{(Equation 26)}$$

In the lower-right block of the matrix (Equation 26), only the diagonal elements include 1s. The output fluctuations are not quantum-limited. For long distances, the output idler quadratures are correlated completely. This behavior is an indication that the idlers evolve in concert, as a sum mode. Equation 20 can be rewritten in terms of the basis vectors. By doing so, one obtains the alternative transfer matrix which is labeled Equation 27 below.

$$T'(z) = \begin{bmatrix} c & s & 0 & \ldots & 0 \\ s & c & 0 & \ldots & 0 \\ 0 & 0 & 1 & \ldots & 0 \\ \vdots & \vdots & \vdots & \ddots & \vdots \\ 0 & 0 & 0 & \ldots & 1 \end{bmatrix} \quad \text{(Equation 27)}$$

The alternative transfer matrix illustrates that n−1 idler-superposition modes are inert, and one idler-superposition mode (the sum mode) undergoes a stretching (squeezing) transformation with the signal, as does the (single) idler in DFG. (The sum of the signal and idler-sum modes is stretched, whereas the difference between the signal and idler-sum modes is squeezed.) This is a general property of parametric processes with unequal numbers of amplitudes and conjugate amplitudes. This also explains why the signal- and some of the idler-generation coefficients in Equation 21 are proportional to $1/n^{1/2}$. In the symmetric case (nonzero input signal), the output signal and idler-sum powers are larger than the input signal power by the usual factors $c^2$ and $s^2$, respectively. The sum mode is a symmetric combination of the physical modes, so the output power in each physical mode is larger than the input signal power by a factor of only $s^2/n$. In the asymmetric case, the input condition (one nonzero input idler) corresponds to an idler-sum mode with the fraction 1/n of the input idler power. The output signal and idler-sum powers are larger than the input idler-sum power by the usual factors $s^2$ and $c^2$, respectively. Hence, the output signal power is larger than the input idler power by the factor $s^2/n$. In the high-gain regime, the contributions of the inert idler-superposition modes to the output idler powers are negligible. Each output idler power is larger than the input idler-sum power by a factor of about $c^2/n$ and the input idler power by a factor of about $c^2/n^2$. One can verify that Equation 28 below is consistent with the output covariance matrix in Equation 11.

$$C'_q = \begin{bmatrix} c^2+s^2 & 2cs & 0 & \ldots & 0 \\ 2cs & c^2+s^2 & 0 & \ldots & 0 \\ 0 & 0 & 1 & \ldots & 0 \\ \vdots & \vdots & \vdots & \ddots & \vdots \\ 0 & 0 & 0 & \ldots & 1 \end{bmatrix} \quad \text{(Equation 28)}$$

As seen above, the output signal has the SNR $(c(p_s))^2/\sigma[1+2s^2]$ and each output idler has the SNR $(s'(p_s))^2/\sigma[1+2(s')^2]$. By combining these results, one obtains the noise figures of Equations 29-30.

$$F_s=2-1/c^2, F_i=2+1/(s')^2 \quad \text{(Equations 29-30)}$$

In the high-gain regime, $c^2 \gg 1$ and $(s')^2=s^2/n \gg 1$. The (common) idler-generation noise figure is 2, independent of n! This result can be interpreted as idler sum-mode generation, with a noise figure of 2, as seen in Equation 12, followed by multiple-idler-mode beam splitting. In the present context, beam splitting does not reduce the SNRs of the output modes relative to that of the input sum mode, because the amplified fluctuations associated with the sum mode swamp the vacuum fluctuations associated with the other modes.

Figure 3:
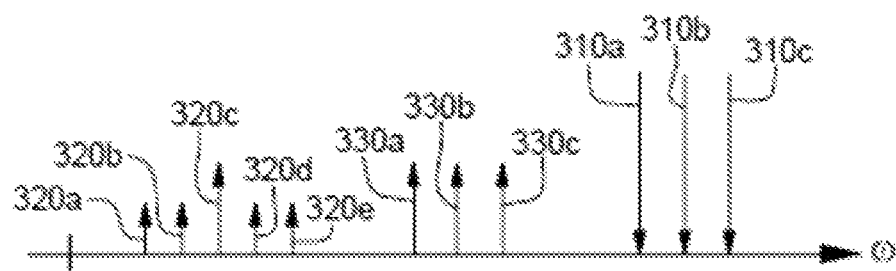
FIG. 3 depicts certain aspects of an embodiment of the present invention.

DFG driven by three pumps is illustrated in FIG. 3. As illustrated herein, secondary TWM (inverse DFG) modified the input signal and generates new signals with frequencies $\omega_s \pm \omega$ and $\omega_s \pm 2\omega$. FIG. 3 is an enhanced frequency diagram that is driven by three pumps 310a-310c. Also pictured are the primary and secondary signals 320a-320e, and the idlers 330a-330c.

Equation 31 is the Schmidt decomposition theorem for DFG.

$$\begin{bmatrix} B_s \\ B_i^{\dagger\prime} \end{bmatrix} = \begin{bmatrix} V_s D_\mu U_s^\dagger & V_s D_\nu U_i' \\ V_i^* D_\nu U_s^\dagger & V_i^* D_\mu U_i' \end{bmatrix} \begin{bmatrix} A_s \\ A_i^{\dagger\prime} \end{bmatrix} \quad \text{(Equation 31)}$$

In Equation 31, $D_\mu = \text{diag}(\mu_j)$, $D_\nu = \text{diag}(\nu_j)$ and $\mu_j^2 - \nu_j^2 = 1$. The Schmidt coefficients, $\mu_j$ and $\nu_j$, characterize signal amplification and idler generation, respectively, and depend on the aforementioned physical parameters. In general, $\nu_1 \geq \nu_2 \geq \ldots \geq \nu_n$. Because the Schmidt coefficients depend exponentially on the pump powers and medium length, if the pump powers are sufficiently high or the medium is sufficiently long, the output is dominated by the first signal and idler Schmidt modes, and the noise figures of the associated amplification and generation processes are 2. Once again, a challenge is to design the system in such a way that the input Schmidt mode resembles the physical signal mode, and the output Schmidt mode has n physical idler components of comparable magnitude. However, DFG produces strong output modes with fluctuations that are stronger than vacuum fluctuations (or the fluctuations associated with the recessive modes). When these Schmidt modes are split into their physical components, the physical noise figures depend inversely on the overlap between the physical signal and the input Schmidt mode, but do not depend on the overlaps between the output Schmidt mode and the physical idlers (because the coherent and incoherent parts of the output mode are split in the same way). In particular, they do not depend on the number of idlers. Hence, multiple DFG presents a promising scheme for signal replication, as illustrated in FIG. 3.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

We claim:

1. A system for generating copies of a signal, comprising:
a first radiation source configured for providing a plurality of pump radiation beams, the plurality of pump radiation beams comprising more than two pump radiation beams;
a second radiation source configured for providing a signal radiation beam; and
a second-order nonlinear optical medium to receive the plurality of pump radiation beams from the first radiation source and the signal radiation beam from the second radiation source and the second-order nonlinear optical medium to generate, by performing three-wave mixing using a process of different frequency generation, a plurality of idlers, the plurality of idlers comprising more than two idlers, wherein the plurality of idlers comprise low-noise copies of the signal, wherein noise figures of the plurality of idlers are equivalent, and wherein the noise figures remain constant, independent of the number of idlers, such that each subsequently generated idler of the plurality of idlers does not degenerate quality of the plurality of idlers by impacting the noise figures, and wherein the noise figures in a high gain regime are 3 dB.

2. The system of claim 1, wherein the first radiation source comprises an optical frequency comb.

3. The system of claim 1, wherein the plurality of pump radiation beams is equal to the plurality of idlers.

4. The system of claim 1, wherein the first radiation source comprises at least two individual lasers.

5. The system of claim 1, wherein the plurality of idlers comprise amplified copies of the signal radiation beam, wherein the plurality of idlers are correlated and phase-dependent.

6. The system of claim 1, further comprising:
an optical preprocessing device to receive the plurality of idlers.

7. The system of claim 6, wherein the optical preprocessing device utilizes a portion of the plurality of idlers in one of: analog-to-digital conversion, or channelization of radio-frequency signals.

8. A method of generating copies of a signal, comprising:
obtaining, by a second-order nonlinear optical medium, a plurality of pump radiation beams from a first radiation source, the plurality of pump radiation beams comprising more than two pump radiation beams;
obtaining, by the second-order nonlinear optical medium, a signal radiation beam from a second radiation source; and
generating, by the second-order nonlinear optical medium, by performing three-wave mixing using a process of different frequency generation, a plurality of idlers, the plurality of idlers comprising more than two idlers, wherein the plurality of idlers comprise low-noise copies of the signal, wherein noise figures of the plurality of idlers are equivalent, and wherein the noise figures remain constant, independent of the number of idlers, such that each subsequently generated idler of the plurality of idlers does not degenerate quality of the plurality of idlers by impacting the noise figures, and wherein the noise figures in a high gain regime are 3 dB.

9. The method of claim 8, wherein the first radiation source comprises an optical frequency comb.

10. The method of claim 8, wherein the plurality of pump radiation beams is equal to the plurality of idlers.

11. The method of claim 8, wherein the first radiation source comprises at least two individual lasers.

12. The method of claim 8, wherein the plurality of idlers comprise amplified copies of the signal radiation beam, wherein the plurality of idlers are correlated and phase-dependent.

13. The method of claim 8, further comprising:
providing, by the second-order non-linear medium, to an optical preprocessing device, the plurality of idlers.

14. The method of claim 13, wherein the optical preprocessing device utilizes a portion of the plurality of idlers in one of: analog-to-digital conversion, or channelization of radio-frequency signals.

15. A method of assembling a system for generating copies of a signal, comprising:
positioning a first radiation source configured for providing a plurality of pump radiation beams to provide the plurality of pump radiation beams to a second-order nonlinear optical medium, wherein the plurality of pump radiation beams comprise more than two pump radiation beams, and wherein the plurality of pump radiation beams enter the second-order nonlinear optical medium from a first direction;
positioning a second radiation source configured for providing a signal radiation beam to provide the signal to the second-order nonlinear optical medium, wherein the plurality of pump radiation beams enter the second-order nonlinear optical medium from the first direction; and
positioning the second-order nonlinear optical medium to receive the plurality of pump radiation beams from the first radiation source and the signal radiation beam from the second radiation source and to generate, by performing three-wave mixing using a process of different frequency generation, a plurality of idlers in a second direction, the plurality of idlers comprising more than two idlers, wherein the plurality of idlers comprise low-noise copies of the signal wherein noise figures of the plurality of idlers are equivalent, and wherein the noise figures remain constant, independent of the number of idlers, such that each subsequently generated idler of the plurality of idlers does not degenerate quality of the plurality of idlers by impacting the noise figures, and wherein the noise figures in a high gain regime are 3 dB.

16. The method of claim 15, wherein the first radiation source comprises an optical frequency comb.

17. The method of claim 15, wherein the first radiation source comprises at least two individual lasers.

* * * * *